US012660038B2

(12) United States Patent
Agiwal et al.

(10) Patent No.: US 12,660,038 B2
(45) Date of Patent: Jun. 16, 2026

(54) METHOD AND APPARATUS OF HANDLING SIDELINK COMMUNICATION IN CELL SUPPORTING NETWORK ENERGY SAVINGS

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 18/421,133

(22) Filed: Jan. 24, 2024

(65) Prior Publication Data

US 2024/0260129 A1 Aug. 1, 2024

(30) Foreign Application Priority Data

Jan. 26, 2023 (KR) ........................ 10-2023-0010378

(51) Int. Cl.
| | |
|---|---|
| *H04W 72/02* | (2009.01) |
| *H04W 72/232* | (2023.01) |
| *H04W 72/40* | (2023.01) |
| *H04W 76/28* | (2018.01) |

(52) U.S. Cl.
CPC ......... *H04W 76/28* (2018.02); *H04W 72/232* (2023.01); *H04W 72/40* (2023.01)

(58) Field of Classification Search
CPC ......... H04W 4/40; H04W 4/46; H04W 28/08; H04W 28/0875; H04W 76/23
See application file for complete search history.

(56) References Cited

U.S. PATENT DOCUMENTS

| | | | |
|---|---|---|---|
| 2022/0110055 A1 | 4/2022 | Hosseini et al. | |
| 2022/0210739 A1 | 6/2022 | Yi et al. | |
| 2022/0224438 A1 | 7/2022 | Park et al. | |
| 2022/0346180 A1* | 10/2022 | Tseng ................... | H04W 76/14 |
| 2022/0394814 A1 | 12/2022 | Liu et al. | |
| 2024/0057133 A1* | 2/2024 | Yoshioka .............. | H04W 72/12 |
| 2024/0373445 A1* | 11/2024 | Zhang ................... | H04W 72/40 |

FOREIGN PATENT DOCUMENTS

| | | | |
|---|---|---|---|
| KR | 10-2024-0006273 A | 1/2024 | |
| WO | 2022018587 A1 | 1/2022 | |

OTHER PUBLICATIONS

International Search Report and Written Opinion of the International Searching Authority dated Apr. 24, 2024, in connection with International Application No. PCT/KR2024/01035, 8 pages.

* cited by examiner

*Primary Examiner* — Bo Hui A Zhu

(57) ABSTRACT

The disclosure relates to a 5G or 6G communication system for supporting a higher data transmission rate. A method performed by a user equipment (UE) in a communication system includes: receiving a discontinuous transmission (DTX) configuration associated with a DTX duration; identifying that the UE is configured with sidelink resource allocation mode 1; in case that the UE is configured with a resource pool for sidelink communication during the DTX duration: switching to sidelink resource allocation mode 2 based on entering the DTX duration; and performing the sidelink communication during the DTX duration based on a resource of the resource pool selected by the UE.

20 Claims, 5 Drawing Sheets

FIG. 2

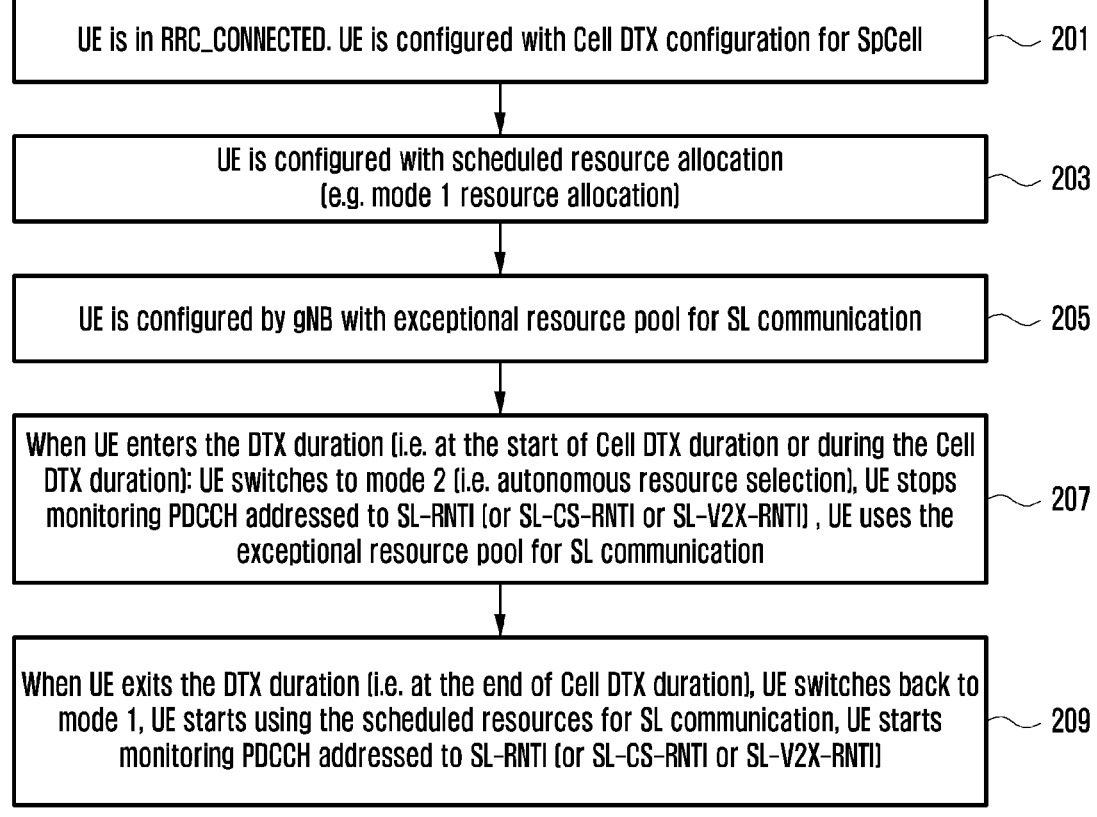

UE is in RRC_CONNECTED. UE is configured with Cell DTX configuration for SpCell    ~ 201

UE is configured with scheduled resource allocation
(e.g. mode 1 resource allocation)    ~ 203

UE is configured by gNB with exceptional resource pool for SL communication    ~ 205

When UE enters the DTX duration (i.e. at the start of Cell DTX duration or during the Cell DTX duration): UE switches to mode 2 (i.e. autonomous resource selection), UE stops monitoring PDCCH addressed to SL-RNTI (or SL-CS-RNTI or SL-V2X-RNTI) , UE uses the exceptional resource pool for SL communication    ~ 207

When UE exits the DTX duration (i.e. at the end of Cell DTX duration), UE switches back to mode 1, UE starts using the scheduled resources for SL communication, UE starts monitoring PDCCH addressed to SL-RNTI (or SL-CS-RNTI or SL-V2X-RNTI)    ~ 209

FIG. 3

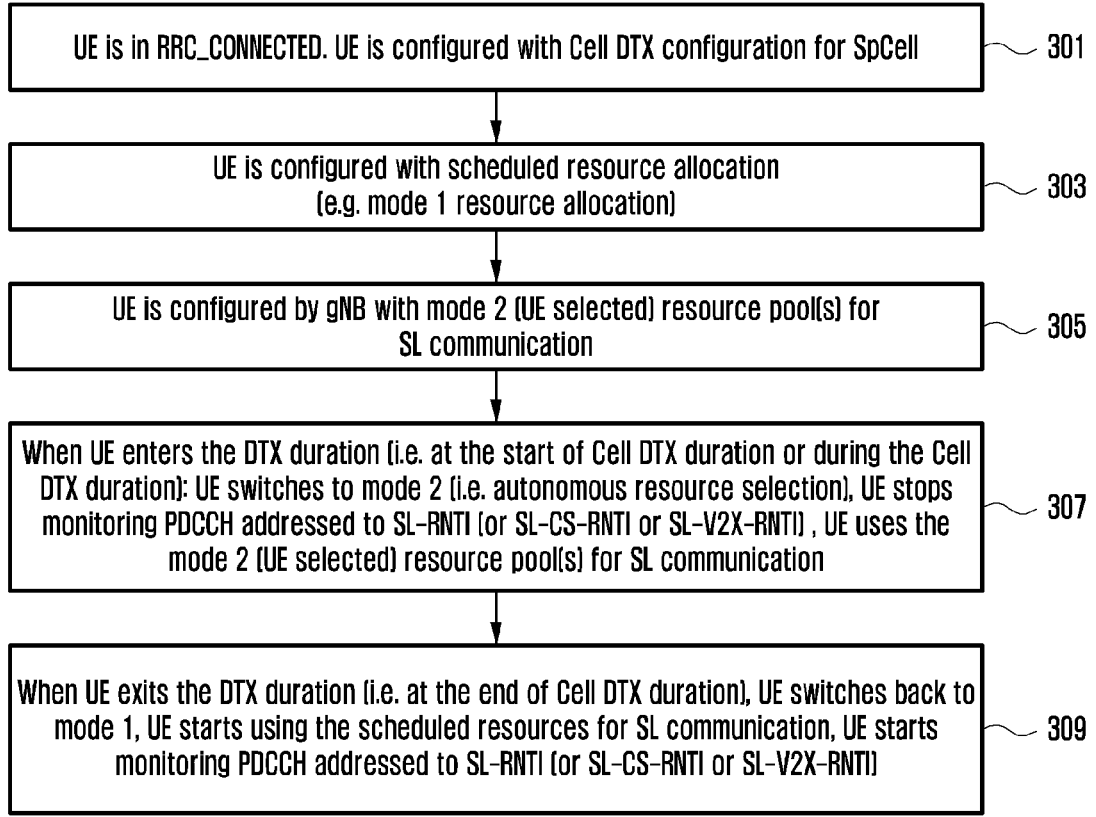

UE is in RRC_CONNECTED. UE is configured with Cell DTX configuration for SpCell — 301

UE is configured with scheduled resource allocation
(e.g. mode 1 resource allocation) — 303

UE is configured by gNB with mode 2 (UE selected) resource pool(s) for
SL communication — 305

When UE enters the DTX duration (i.e. at the start of Cell DTX duration or during the Cell
DTX duration): UE switches to mode 2 (i.e. autonomous resource selection), UE stops
monitoring PDCCH addressed to SL-RNTI (or SL-CS-RNTI or SL-V2X-RNTI) , UE uses the
mode 2 (UE selected) resource pool(s) for SL communication — 307

When UE exits the DTX duration (i.e. at the end of Cell DTX duration), UE switches back to
mode 1, UE starts using the scheduled resources for SL communication, UE starts
monitoring PDCCH addressed to SL-RNTI (or SL-CS-RNTI or SL-V2X-RNTI) — 309

METHOD AND APPARATUS OF HANDLING SIDELINK COMMUNICATION IN CELL SUPPORTING NETWORK ENERGY SAVINGS

CROSS-REFERENCE TO RELATED APPLICATION

This application is based on and claims priority under 35 U.S.C. § 119 to Korean Patent Application No. 10-2023-0010378, filed Jan. 26, 2023, in the Korean Intellectual Property Office, the disclosure of which is incorporated by reference herein in its entirety.

BACKGROUND

1. Field

The disclosure relates to a wireless communication system. Specifically, the disclosure relates to an apparatus, a method and a system for handling sidelink communication in a cell supporting network energy savings.

2. Background Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (bandwidth part), new channel coding methods such as a LDPC (low density parity check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (vehicle-to-everything) for aiding driving determination by autonomous vehicles based on information regarding positions and states of vehicles transmitted by the vehicles and for enhancing user convenience, NR-U (new radio Unlicensed) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, IAB (integrated access and backhaul) for providing a node for network service area expansion by supporting a wireless backhaul link and an access link in an integrated manner, mobility enhancement including conditional handover and DAPS (dual active protocol stack) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting AR (augmented reality), VR (virtual reality), MR (mixed reality) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using OAM (orbital angular momentum), and RIS (reconfigurable intelligent surface), but also full-duplex technology for increasing frequency efficiency of 6G mobile communication technologies and improving system networks, AI-based communication technology for implementing system optimization by utilizing satellites and AI (artificial intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The disclosure may provide an apparatus, a method and a system for handling sidelink communication in a cell supporting network energy savings.

The technical objects to be achieved by various embodiments of the disclosure are not limited to the technical objects mentioned above, and other technical objects not mentioned may be considered by those skilled in the art from various embodiments of the disclosure to be described below.

According to an embodiment of the disclosure, a method performed by a user equipment (UE) in a communication system is provided.

According to an embodiment of the disclosure, the method includes: receiving a discontinuous transmission (DTX) configuration associated with a DTX duration; identifying that the UE is configured with sidelink resource allocation mode 1; in case that the UE is configured with a resource pool for sidelink communication during the DTX duration: switching to sidelink resource allocation mode 2 based on entering the DTX duration; and performing the sidelink communication during the DTX duration based on a resource selected by the UE from the resource pool for the sidelink communication.

According to an embodiment of the disclosure, monitoring a physical downlink control channel (PDCCH) is stopped during the DTX duration.

According to an embodiment of the disclosure, the PDCCH is addressed to a radio network temporary identifier (RNTI) associated with the sidelink resource allocation mode 1.

According to an embodiment of the disclosure, using of a sidelink configured grant (CG) resource for a sidelink CG type 2 configured to the UE is suspended during the DTX duration in case that the UE is configured with the resource pool for the sidelink communication during the DTX duration.

According to an embodiment of the disclosure, the method further includes: in case that the UE is configured with the resource pool for the sidelink communication during the DTX duration and the DTX duration is terminated: switching to the sidelink resource allocation mode 1; monitoring the PDCCH addressed to the RNTI associated with the sidelink resource allocation mode 1; and performing the sidelink communication based on a scheduled resource identified by the PDCCH.

According to an embodiment of the disclosure, the resource pool for the sidelink communication during the DTX duration is same as or different from a resource pool for radio link failure (RLF).

According to an embodiment of the disclosure, the resource pool for the sidelink communication during the DTX duration is a resource pool for the sidelink resource allocation mode 2.

According to an embodiment of the disclosure, the resource pool for the sidelink communication during the DTX duration is configured via a system information block (SIB) or a dedicated radio resource control (RRC) message.

According to an embodiment of the disclosure, in case that the UE switches to sidelink resource allocation mode 2 based on entering the DTX duration, at least one of sidelink resource allocation mode 1 related procedures which is pended is suspended or cancelled before the DTX duration being terminated.

According to an embodiment of the disclosure, the sidelink resource allocation mode 1 related procedures includes: a procedure for scheduling request (SR), a procedure for buffer status report (BSR), and a procedure for hybrid automatic repeat request (HARQ) feedback.

According to an embodiment of the disclosure, the method further includes: in case that the UE is not configured with the resource pool for the sidelink communication during the DTX duration and the UE is configured with a sidelink CG resource for a sidelink CG type 1 or 2: switching to the sidelink resource allocation mode 2 based on entering the DTX duration; and performing the sidelink communication during the DTX duration based on the sidelink CG resource.

According to an embodiment of the disclosure, the method further includes: in case that the UE is not configured with the resource pool for the sidelink communication during the DTX duration and the UE is configured with the sidelink CG resource: switching to the sidelink resource allocation mode 1; monitoring the PDCCH addressed to the RNTI associated with the sidelink resource allocation mode 1; and performing the sidelink communication based on a scheduled resource identified by the PDCCH and the sidelink CG resource.

According to an embodiment of the disclosure, the UE is configured with a resource pool for the sidelink resource allocation mode 1, and the DTX configuration is configured for a special cell (SpCell) of the UE.

According to an embodiment of the disclosure, a user equipment (UE) in a communication system is provided.

According to an embodiment of the disclosure, the UE includes: a transceiver; and a processor coupled with the transceiver and configured to: receive a discontinuous transmission (DTX) configuration associated with a DTX duration; identify that the UE is configured with sidelink resource allocation mode 1; in case that the UE is configured with a resource pool for sidelink communication during the DTX duration: switch to sidelink resource allocation mode 2 based on entering the DTX duration; and perform the sidelink communication during the DTX duration based on a resource selected by the UE from the resource pool for the sidelink communication.

According to an embodiment of the disclosure, monitoring a PDCCH is stopped during the DTX duration.

According to an embodiment of the disclosure, the PDCCH is addressed to a radio network temporary identifier (RNTI) associated with the sidelink resource allocation mode 1.

According to an embodiment of the disclosure, using of a sidelink configured grant (CG) resource for a sidelink CG type 2 configured to the UE is suspended during the DTX duration in case that the UE is configured with the resource pool for the sidelink communication during the DTX duration.

According to an embodiment of the disclosure, the processor is further configured to: in case that the UE is configured with the resource pool for the sidelink communication during the DTX duration and the DTX duration is terminated: switch to the sidelink resource allocation mode 1; monitor the PDCCH addressed to the RNTI associated with the sidelink resource allocation mode 1; and perform the sidelink communication based on a scheduled resource identified by the PDCCH.

According to an embodiment of the disclosure, the resource pool for the sidelink communication during the DTX duration is same as or different from a resource pool for radio link failure (RLF).

According to an embodiment of the disclosure, the resource pool for the sidelink communication during the DTX duration is a resource pool for the sidelink resource allocation mode 2.

According to an embodiment of the disclosure, the resource pool for the sidelink communication during the DTX duration is configured via a system information block (SIB) or a dedicated radio resource control (RRC) message.

According to an embodiment of the disclosure, in case that the UE switches to sidelink resource allocation mode 2 based on entering the DTX duration, at least one of sidelink resource allocation mode 1 related procedures which is pended is suspended or cancelled before the DTX duration being terminated.

According to an embodiment of the disclosure, the sidelink resource allocation mode 1 related procedures includes: a procedure for SR, a procedure for BSR, and a procedure for HARQ feedback.

According to an embodiment of the disclosure, the processor is further configured to: in case that the UE is not configured with the resource pool for the sidelink communication during the DTX duration and the UE is configured with a sidelink CG resource for a sidelink CG type 1 or 2: switch to the sidelink resource allocation mode 2 based on entering the DTX duration; and perform the sidelink communication during the DTX duration based on the sidelink CG resource.

According to an embodiment of the disclosure, the processor is further configured to: in case that the UE is not configured with the resource pool for the sidelink communication during the DTX duration and the UE is configured with the sidelink CG resource: switch to the sidelink resource allocation mode 1; monitor the PDCCH addressed to the RNTI associated with the sidelink resource allocation mode 1; and perform the sidelink communication based on a scheduled resource identified by the PDCCH and the sidelink CG resource.

According to an embodiment of the disclosure, the UE is configured with a resource pool for the sidelink resource allocation mode 1, and the DTX configuration is configured for a SpCell of the UE.

The above-described various embodiments of the disclosure are merely some of the preferred embodiments of the disclosure, and various embodiments reflecting the technical features of the disclosure may be derived and understood by those skilled in the art based on the following detailed description of the disclosure.

The disclosure may provide an apparatus, a method and a system for handling sidelink communication in a cell supporting network energy savings.

The effects that can be achieved through the disclosure are not limited to the effects mentioned in the various embodiments, and other effects not mentioned will be clearly understood by those skilled in the art from the description below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates an example method performed by a UE according to an embodiment of the disclosure;

FIG. 3 illustrates an example method performed by a UE according to an embodiment of the disclosure;

DETAILED DESCRIPTION

Figure 1:
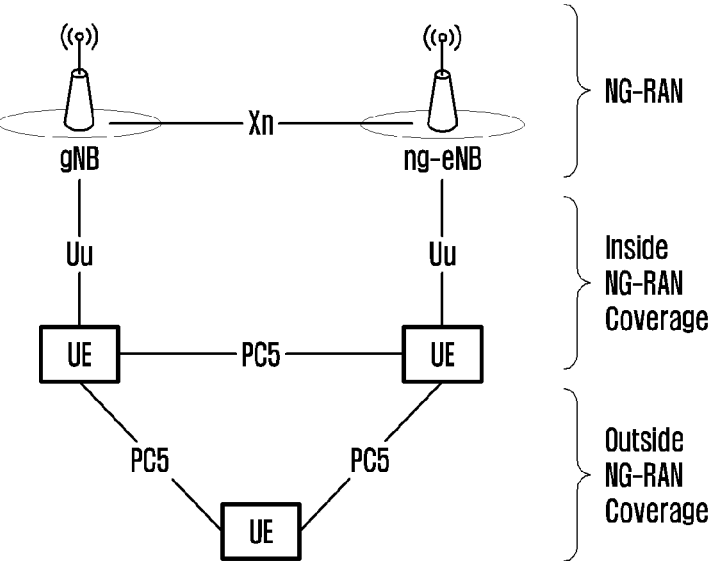
FIG. 1 illustrates an example of a communication system according to an embodiment of the disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings but are merely used herein to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5gNB), or gNB.

The "UE" is an entity communicating with a BS and may be referred to as UE, device, mobile station (MS), mobile equipment (ME), or terminal.

In the recent years, several broadband wireless technologies have been developed to meet the growing number of broadband subscribers and to provide more and better applications and services. The second-generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced mobile broadband (eMBB), massive machine type communication (m-MTC), ultra-reliable low latency communication (URLLC) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the internet of things (IoT)/internet of everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, a UE and a gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end.

In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance.

Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT dual connectivity (MR-DC) operation whereby a UE in RRC_CONNECTED is configured to utilize radio resources provided by two distinct schedulers, located in two different nodes connected via a non-ideal backhaul and providing either evolved universal terrestrial radio access (E-UTRA) (i.e., if the node is an next generation evolved Node-B (ng-eNB)) or NR access (i.e., if the node is a gNB).

In NR for a UE in RRC_CONNECTED not configured with carrier aggregation/dual connectivity (CA/DC), there is only one serving cell comprising of the primary cell. For a UE in RRC_CONNECTED configured with CA/DC the term 'serving cells' is used to denote the set of cells comprising of the special cell(s) and all secondary cells. In NR the term master cell group (MCG) refers to a group of serving cells associated with the master node, comprising of the primary cell (PCell) and optionally one or more secondary cells (SCells). In NR the term secondary cell group (SCG) refers to a group of serving cells associated with the secondary node, comprising of the primary secondary cell (or primary SCG cell) (PSCell) and optionally one or more SCells. In NR, PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. PSCell refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

System information acquisition in fifth generation wireless communication system is described. In the fifth generation wireless communication system, a node B (gNB) or a base station in cell broadcast Synchronization Signal and Physical Broadcast Channel (PBCH) block (SSB) includes primary and secondary synchronization signals (PSS, SSS) and system information. System information includes common parameters needed to communicate in cell. In the fifth generation wireless communication system (also referred as next generation radio or NR), System Information (SI) is divided into the master information block (MIB) and a number of system information blocks (SIBs) where:

the MIB is transmitted on the broadcast channel (BCH) with a periodicity of 80 ms and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (physical random access channel (PRACH) preamble(s) and PRACH resource(s)) for requesting gNB to broadcast one or more SI message(s).

SIBs other than SIB1 are carried in System Information (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which includes one or several cells and is identified by systemInformation-AreaID.

A UE acquires SIB 1 from the camped or serving cell. UE check the BroadcastStatus bit in SIB 1 for SI message which the UE needs to acquire. SI request configuration for supplementary uplink (SUL) is signaled by gNB using the information element (IE) si-RequestConfigSUL in SIB1. If the IE si-RequestConfigSUL is not present in SIB1, the UE considers that SI request configuration for SUL is not signaled by the gNB. SI request configuration for NUL is signaled by the gNB using the IE si-RequestConfig in SIB1. If the IE si-RequestConfig is not present in SIB1, the UE considers that SI request configuration for NUL is not signaled by the gNB. If SI message which the UE needs to acquire is not being broadcasted (i.e., BroadcastStatus bit is set to zero), the UE initiates transmission of SI request. The procedure for SI request transmission is as follows:

If SI request configuration is signaled by gNB for SUL, and criteria to select SUL is met (i.e., reference signal received power (RSRP) derived from SSB measurements of camped or serving cell<rsrp-ThresholdSSB-SUL, where rsrp-ThresholdSSB-SUL is signaled by a gNB (e.g., in broadcast signaling such as SIB1)): a UE initiate transmission of SI request based on message 1 (Msg1) based SI request on SUL. In other words, the UE initiates Random Access procedure using the PRACH preamble(s) and PRACH resource(s) in SI request configuration of SUL. The UE transmits Msg1 (i.e., random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

Else if SI request configuration is signaled by a gNB for NUL and criteria to select normal uplink (NUL) is met (i.e., NUL is selected if SUL is supported in camped or serving cell and RSRP derived from SSB measurements of camped or serving cell>=rsrp-ThresholdSSB-SUL; OR NUL is selected if SUL is not supported in serving cell): a UE initiate transmission of SI request based on Msg1 based SI request on NUL. In other words, the UE initiates Random Access procedure using the PRACH preamble(s) and PRACH resource(s) in SI request configuration of NUL. The UE transmits Msg1 (i.e., Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, the UE monitors the SI window of the requested SI message in one or more SI period(s) of that SI message.

Else a UE initiate transmission of SI request based on message 3 (Msg3) based SI request. In other words, the UE initiate transmission of RRCSystemInfoRequest message. The UE transmits Msg1 (i.e., Random access preamble) and waits for random access response. Common random access resources (PRACH preamble(s) and PRACH occasions(s)) are used for Msg1. In the uplink (UL) grant received in random access response, the UE transmits RRCSystemInfoRequest message and waits for acknowledgement for SI request (i.e., RRCSystemInfoRequest message). If acknowledgement for SI request (i.e., RRCSystemInfoRequest message) is received, the UE monitors the SI window of the requested SI message in one or more SI period(s) of that SI message. Note that if SUL is configured, UL carrier for Msg1 transmission will be selected by UE in similar manner as selected by UE for Msg1 based SI request. SUL is the selected UL carrier, if RSRP derived from SSB measurements of camped or serving cell<rsrp-ThresholdSSB-SUL where rsrp-Threshold-SSB-SUL is signaled by gNB (e.g., in broadcast signaling such as SIB1). NUL is the selected UL carrier, if RSRP derived from SSB measurements of camped or serving cell>=rsrp-ThresholdSSB-SUL where rsrp-ThresholdSSB-SUL is signaled by gNB (e.g., in broadcast signalling such as SIB1).

A physical downlink control channel (PDCCH) in fifth generation wireless communication system is described. In the fifth generation wireless communication system, PDCCH is used to schedule downlink (DL) transmissions on physical downlink shared channel (PDSCH) and UL transmissions on physical uplink shared channel (PUSCH), where the Downlink Control Information (DCI) on PDCCH includes at least one of: Downlink assignments containing at least modulation and coding format, resource allocation, and hybrid-automatic repeat request (HARQ or hybrid-ARQ) information related to DL-SCH; Uplink scheduling grants containing at least modulation and coding format, resource allocation, and hybrid-ARQ information related to uplink shared channel (UL-SCH). In addition to scheduling, PDCCH can be used to for at least one of: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of TPC commands for physical uplink control channel (PUCCH) and PUSCH; Transmission of one or more transmit power control (TPC) commands for sounding reference signal (SRS) transmissions by one or more UEs; Switching a UE's active bandwidth part; Initiating a random access procedure.

A UE monitors a set of PDCCH candidates in the configured monitoring occasions in one or more configured control resource sets (CORESETs) according to the corresponding search space configurations. A CORESET includes a set of PRBs with a time duration of 1 to 3 OFDM symbols. The resource units resource element groups (REGs) and control channel elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). quadrature phase shift keying (QPSK) modulation is used for PDCCH.

In fifth generation wireless communication system, a list of search space configurations are signaled by gNB for each configured BWP wherein each search space configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0.$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORESET associated with the search space. Search space configuration includes the identifier of CORESET configuration associated with it. A list of coreset configurations is signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing (SCS). The number of slots in a radio frame and duration of slots depends on the radio frame for each supported SCS and is pre-defined in NR.

Each CORESET configuration is associated with a list of Transmission configuration indicator (TCI) states. One downlink reference signal (DL RS) identifier (ID) (SSB or channel state information reference signal (CSI RS)) is configured per TCI state. The list of TCI states corresponding to a coreset configuration is signaled by gNB via radio resource control (RRC) signaling. One of the TCI state in TCI state list is activated and indicated to UE by gNB via medium access control (MAC) control element (CE). TCI state indicates the DL TX beam (DL TX beam is quasi co-located (QCLed) with SSB/CSI RS of TCI state) used by gNB for transmission of PDCCH in the PDCCH monitoring occasions of a search space. For PDSCH, TCI state of scheduling PDCCH can be used for scheduled PDSCH. Alternately, TCI state of the PDCCH for the lowest CORESET ID in the slot is used for PDSCH. Alternately, combination of RRC+MAC CE+DCI is used to indicate the TCI state for PDSCH. RRC configures a list of TCI state, MAC CE indicates a subset of these TCI states and DCI indicates one of the TCI state from list of TCI states indicated in MAC CE.

Bandwidth adaptation in fifth generation wireless communication system is described. In fifth generation wireless communication system, bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can be moved in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell.

In RRC connected state, a UE is configured with one or more DL and UL BWPs, for each configured serving cell (i.e., PCell or SCell). For an activated serving cell, there is one active UL and DL BWP at any point in time. The BWP switching for a serving cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of random access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

Random access in fifth generation wireless communication system is described. In the 5G wireless communication system, random access (RA) is supported. Random access (RA) is used to achieve uplink (UL) time synchronization. RA is used during initial access, handover, radio resource control (RRC) connection re-establishment procedure, SR transmission, secondary cell group (SCG) addition/modification, beam failure recovery and data or control information transmission in UL by non-synchronized UE in RRC CONNECTED state. Several types of random access procedure is supported.

Contention based random access (CBRA) is described. This is also referred as 4 step CBRA. In this type of random access, UE first transmits Random Access preamble (also referred as Msg1) and then waits for Random access response (RAR) in the RAR window. RAR is also referred as message 2 (Msg2). Next generation node B (gNB) transmits the RAR on physical downlink shared channel (PDSCH). PDCCH scheduling the PDSCH carrying RAR is addressed to random access (RA)-radio network temporary identifier (RA-RNTI).

RA-RNTI identifies the time-frequency resource (also referred as PRACH occasion or PRACH transmission (TX) occasion or RA channel (RACH) occasion) in which RA preamble was detected by gNB. The RA-RNTI is calculated as follows:

$$\text{RA-RNTI}=1+s\_id+14*t\_id+14*80*f\_id+14*80*8*ul\_carrier\_id,$$

where s_id is the index of the first orthogonal frequency division multiplexing (OFDM) symbol of the PRACH occasion where UE has transmitted Msg1, i.e. RA preamble; $0 \le s\_id < 14$; t_id is the index of the first slot of the PRACH occasion ($0 \le t\_id < 80$); f_id is the index of the PRACH occasion within the slot in the frequency domain ($0 \le f\_id < 8$), and ul_carrier_id is the UL carrier used for Msg1 transmission (0 for normal UL (NUL) carrier and 1 for supplementary UL (SUL) carrier.

Several RARs for various random access preambles detected by gNB can be multiplexed in the same RAR medium access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e., select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number).

After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped, and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped, and RA procedure is completed. If the contention resolution timer expires and the UE has not yet transmitted the RA preamble for a configurable number of times, the UE goes back to first step i.e., select random access resource (preamble/RACH occasion) and transmits the RA preamble. A backoff may be applied before going back to first step.

Contention free random access (CFRA) is described. This is also referred as legacy CFRA or 4 step CFRA. CFRA procedure is used for scenarios such as handover where low latency is required, timing advance establishment for SCell, etc. Evolved node B (eNB) assigns to UE dedicated Random access preamble. A UE transmits the dedicated RA preamble. The eNB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and the UE has not yet transmitted the RA preamble for a configurable (configured by gNB in RACH configuration) number of times, the UE retransmits the RA preamble.

For certain events such as handover and beam failure recovery if dedicated preamble(s) are assigned to UE, during first step of random access i.e., during random access resource selection for Msg1 transmission UE determines whether to transmit dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/RACH occasions (ROs)) are provided by gNB, UE select non dedicated preamble. Otherwise, UE select dedicated preamble. So, during the RA procedure, one random access attempt can be CFRA while other random access attempt can be CBRA.

2 step contention based random access (2 step CBRA) is described. In the first step, UE transmits random access preamble on PRACH and a payload (i.e., MAC PDU) on PUSCH. The random access preamble and payload transmission is also referred as message A (MsgA). In the second step, after MsgA transmission, the UE monitors for a response from the network (i.e., gNB) within a configured window. The response is also referred as message B (MsgB). Next generation node B (gNB) transmits the MsgB on PDSCH. PDCCH scheduling the PDSCH carrying MsgB is addressed to MsgB-radio network temporary identifier (MSGB-RNTI).

MSGB-RNTI identifies the time-frequency resource (also referred as PRACH occasion or PRACH transmission (TX) occasion or RACH occasion) in which RA preamble was detected by gNB. The MSGB-RNTI is calculated as follows:

$$MSGB\text{-}RNTI = 1 + s\_id + 14 * t\_id + 14 * 80 * f\_id + 14 * 80 * 8 * ul\_carrier\_id + 14 \times 80 \times 8 \times 2,$$

where s_id is the index of the first orthogonal frequency division multiplexing (OFDM) symbol of the PRACH occasion where UE has transmitted Msg1, i.e. RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier.

If CCCH SDU was transmitted in MsgA payload, a UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include fallback information corresponding to the random access preamble transmitted in MsgA. If the fallback information is received, the UE transmits Msg3 and performs contention resolution using message 4 (Msg4) as in CBRA procedure. If contention resolution is successful, random access procedure is considered successfully completed. If contention resolution fails upon fallback (i.e., upon transmitting Msg3), UE retransmits MsgA. If configured window in which the UE monitors network response after transmitting MsgA expires and the UE has not received MsgB including contention resolution information or fallback information as explained above, the UE retransmits MsgA. If the random access procedure is not successfully completed even after transmitting the msgA configurable number of times, the UE fallbacks to 4 step RACH procedure i.e., the UE only transmits the PRACH preamble.

MsgA payload may include one or more of common control channel (CCCH) service data unit (SDU), dedicated control channel (DCCH) SDU, dedicated traffic channel (DTCH) SDU, BSR MAC control element (CE), power headroom report (PHR) MAC CE, SSB information, C-RNTI MAC CE, or padding. MsgA may include UE ID (e.g., random ID, S-TMSI, C-RNTI, resume ID, etc.) along with preamble in first step. The UE ID may be included in the MAC PDU of the MsgA. The UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc.

The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g., in connected state), the UE ID is C-RNTI.

In case UE is in INACTIVE state, UE ID is a resume ID. In addition to UE ID, some addition control (ctrl) information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA) is described. In this case, gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e., dedicated preamble/PUSCH resource/RO). In the second step, after MsgA transmission, the UE monitors for a response from the network (i.e., gNB) within a configured window. The response is also referred as MsgB.

Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as a PRACH occasion or PRACH transmission (TX) occasion or RACH occasion) in which RA preamble was detected by gNB. The MSGB-RNTI is calculated as follows:

$$MSGB\text{-}RNTI = 1 + s\_id + 14 * t\_id + 14 * 80 * f\_id + 14 * 80 * 8 * ul\_carrier\_id + 14 \times 80 \times 8 \times 2,$$

where $s\_id$ is the index of the first orthogonal frequency division multiplexing (OFDM) symbol of the PRACH occasion where UE has transmitted Msg1, i.e. RA preamble; $0 \le s\_id < 14$; $t\_id$ is the index of the first slot of the PRACH occasion $(0 \le t\_id < 80)$; $f\_id$ is the index of the PRACH occasion within the slot in the frequency domain $(0 \le f\_id < 8)$, and $ul\_carrier\_id$ is the UL carrier used for Msg1 transmission (0 for normal UL (NUL) carrier and 1 for supplementary UL (SUL) carrier.

If UE receives PDCCH addressed to C-RNTI, random access procedure is considered successfully completed. If UE receives fallback information corresponding to its transmitted preamble, random access procedure is considered successfully completed.

For certain events such as handover and beam failure recovery if dedicated preamble(s) and PUSCH resource(s) are assigned to UE, during first step of random access i.e., during random access resource selection for MsgA transmission UE determines whether to transmit dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs/PUSCH resources) are provided by gNB, UE select non dedicated preamble.

Otherwise, UE select dedicated preamble. So, during the RA procedure, one random access attempt can be 2 step CFRA while other random access attempt can be 2 step CBRA.

Upon initiation of random access procedure, a UE first selects the carrier (SUL or NUL). If the carrier to use for the random access procedure is explicitly signaled by gNB, UE select the signaled carrier for performing Random Access procedure. If the carrier to use for the random access procedure is not explicitly signaled by gNB; and if the Serving Cell for the Random Access procedure is configured with supplementary uplink and if the RSRP of the downlink pathloss reference is less than rsrp-ThresholdSSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise, UE selects 2 step RACH.

4G and 5G wireless communication system supports vehicular communication services. Vehicular communication services, represented by V2X services, can include the following four different types: vehicle to vehicle (V2V), vehicle to infrastructure (V2I), vehicle to nomadic device (V2N) and vehicle-to-pedestrian (V2P). In fifth generation (also referred as NR or New Radio) wireless communication system, V2X communication is being enhanced to support enhanced V2X use cases, which are broadly arranged into four use case groups:

1) Vehicles platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

2) Extended sensors enable the exchange of raw or processed data gathered through local sensors or live video images among vehicles, road site units, devices of pedestrian and V2X application servers. The vehicles can increase the perception of their environment beyond of what their own sensors can detect and have a broader and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves, or remote vehicles located in dangerous environments. For a case where variation is limited and routes are predictable, such as public transportation, driving based on cloud computing can be used. High reliability and low latency are the main requirements.

FIG. 1 illustrates an example of communication system according to an embodiment of the disclosure.

V2X services can be provided by PC5 interface and/or Uu interface. Support of V2X services via PC5 interface is provided by NR sidelink (SL) communication or V2X sidelink communication, which is a mode of communication whereby UEs can communicate with each other directly over the PC5 interface using NR technology or EUTRA technology respectively without traversing any network node. This communication mode is supported when the UE is served by radio access network (RAN) and when the UE is outside of RAN coverage. Only the UEs authorized to be used for V2X services can perform NR or V2X sidelink communication. The next generation-radio access network (NG-RAN) architecture supports the PC5 interface as illustrated in FIG. 1. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR sidelink communication and/or V2X sidelink communication. NR sidelink communication may be used to support other services than V2X services.

NR or V2X sidelink communication can support three types of transmission modes. Unicast transmission, characterized by support of at least one PC5-RRC connection between peer UEs; transmission and reception of control information and user traffic between peer UEs in sidelink; support of sidelink HARQ feedback; support of radio link control (RLC) acknowledged mode (AM); and support of sidelink radio link monitoring (RLM) for both peer UEs to detect RLF. Groupcast transmission, characterized by: Transmission and reception of user traffic among UEs belonging to a group in sidelink; Support of sidelink HARQ feedback. Broadcast transmission, characterized by: Transmission and reception of user traffic among UEs in sidelink.

The access-stratum (AS) protocol stack for the control plane in the PC5 interface includes RRC, packet data convergence protocol (PDCP), RLC and MAC sublayer, and the physical layer. The AS protocol stack for user plane in the PC5 interface includes service data adaptation protocol (SDAP), PDCP, RLC and MAC sublayer, and the physical layer. Sidelink radio bearers (SLRB) are categorized into two groups: sidelink data radio bearers (SL DRB) for user plane data and sidelink signaling radio bearers (SL SRB) for control plane data. Separate SL SRBs using different SCCHs are configured for PC5-RRC and PC5-S signaling respectively.

The MAC sublayer provides the following services and functions over the PC5 interface:

Radio resource selection; packet filtering; priority handling between uplink and sidelink transmissions for a given UE; sidelink CSI reporting. With logical channel prioritization (LCP) restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a sidelink shared channel (SL-SCH) MAC header including portions of both Source Layer-2 ID and a Destination Layer-2 ID is added to each MAC PDU. Logical channel ID (LCID) included within a MAC subheader uniquely identifies a logical channel within the scope of the Source Layer-2 ID and Destination Layer-2 ID combination. The following logical channels are used in sidelink:

Sidelink control channel (SCCH): a sidelink channel for transmitting control information from one UE to other UE(s);

Sidelink traffic channel (STCH): a sidelink channel for transmitting user information from one UE to other UE(s);

Sidelink broadcast control channel (SBCCH): a sidelink channel for broadcasting sidelink system information from one UE to other UE(s).

The following connections between logical channels and transport channels exist:

SCCH can be mapped to SL-SCH;

STCH can be mapped to SL-SCH;

SBCCH can be mapped to sidelink broadcast channel (SL-BCH).

Sidelink operation involves the following physical layer channels and signals

Physical sidelink control channel (PSCCH) indicates resource and other transmission parameters used by a UE for a physical sidelink shared channel (PSSCH). PSCCH transmission is associated with a DM-RS.

PSSCH transmits the transport blocks (TBs) of data themselves, and control information for HARQ procedures and channel state information (CSI) feedback triggers, etc. At least 6 OFDM symbols within a slot are used for PSSCH transmission. PSSCH transmission is associated with a DM-RS and may be associated with a phase tracking reference signal (PT-RS).

Physical sidelink feedback channel (PSFCH) carries HARQ feedback over the sidelink from a UE which is an intended recipient of a PSSCH transmission to the UE which performed the transmission. PSFCH sequence is transmitted in one physical resource block (PRB) repeated over two OFDM symbols near the end of the sidelink resource in a slot.

The Sidelink synchronization signal includes sidelink primary and sidelink secondary synchronization signals (S-PSS, S-SSS), each occupying 2 symbols and 127 subcarriers. physical sidelink broadcast channel (PSBCH) occupies 9 and 5 symbols for normal and extended cyclic prefix (CP) cases respectively, including the associated DM-RS.

For unicast, channel state information reference signal (CSI-RS) is supported for CSI measurement and reporting in sidelink. A CSI report is carried in a sidelink MAC CE.

The RRC sublayer provides the following services and functions over the PC5 interface:

Transfer of a PC5-RRC message between peer UEs;

Maintenance and release of a PC5-RRC connection between two UEs;

Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established as specified in TS 23.287. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, UE releases the PC5-RRC connection.

The UE can operate in two modes for resource allocation in sidelink:

Scheduled resource allocation (also referred as mode 1 resource allocation), characterized by:

The UE needs to be RRC_CONNECTED in order to transmit data;

NG-RAN schedules transmission resources.

UE autonomous resource selection (also referred as mode 2 resource allocation), characterized by:

The UE can transmit data when inside NG-RAN coverage, irrespective of which RRC state the UE is in, and when outside NG-RAN coverage;

The UE autonomously selects transmission resources from a pool of resources.

For NR sidelink communication, the UE performs sidelink transmissions only on a single carrier.

Scheduled Resource Allocation is described. NG-RAN can dynamically allocate resources to the UE via the sidelink radio network temporary identifier (SL-RNTI) on PDCCH(s) for NR sidelink communication. In addition, NG-RAN can allocate sidelink resources to UE with two types of configured sidelink grants:

With type 1, RRC directly provides the configured sidelink grant for NR sidelink communication With type 2, RRC provides the periodicity of the configured sidelink grant while PDCCH can either signal and activate the configured sidelink grant, or deactivate it. The PDCCH provides the actual grant (i.e., resources) to be used. The PDCCH is addressed to sidelink configured scheduling radio network temporary identifier (SL-CS-RNTI) for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE can send sidelink buffer status report to support scheduler operation in NG-RAN. The sidelink buffer status reports refer to the data that is buffered in for a group of logical channels (logical channel group, LCG) per destination in the UE. Eight LCGs are used for reporting of the sidelink buffer status reports. Two formats, which are sidelink buffer status report (SL BSR) and truncated SL BSR, are used.

UE autonomous resource allocation is described. The UE autonomously selects sidelink grant from a pool of resources provided by broadcast system information or dedicated signaling while inside NG-RAN coverage or by pre-configuration while outside NG-RAN coverage.

For NR sidelink communication, the pools of resources can be provided for a given validity area where the UE does not need to acquire a new pool of resources while moving within the validity area, at least when this pool is provided by SIB (e.g., reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with Global Navigation Satellite System (GNSS) in case GNSS is configured as synchronization source.

If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available.

For exceptional cases (e.g., during RLF, during transition from RRC IDLE/RRC_INACTIVE to RRC CONNECTED or during change of dedicated V2X sidelink resource pools within a cell), the UE may select resources in the exceptional pool provided in serving cell's SIB (e.g., SIB21) or in dedicated signaling based on random selection, and uses them temporarily. During cell reselection, the RRC_IDLE/ RRC_INACTIVE UE may use the randomly selected resources from the exceptional transmission resource pool of the reselected cell until the sensing results on the transmission resource pools for autonomous resource selection are available.

Embodiments of the disclosure will be described in detail with reference to the accompanying drawings. A base station refers to an entity that allocates resources to a terminal, and may be at least one of a gNode B, a gNB, an eNode B, a node B, a base station (BS), a radio access unit, a base station controller, or a node on a network. A terminal may include user equipment (UE), a mobile station (MS), a cellular phone, a smart phone, a computer, or a multimedia system capable of performing a communication function. Although embodiments of the disclosure will be described with reference to a 5G system as an example, embodiments of the disclosure are also applicable to other communication systems having similar technical backgrounds or channel types. For example, mobile communication technologies developed after 5G may be included therein. Therefore, embodiments of the disclosure are also applicable to other communication systems through a partial modification without substantially deviating from the scope of the disclosure as deemed by those skilled in the art. The embodiments of the disclosure described hereinafter may be applied simultaneously or in combination.

For network energy savings, Cell discontinuous transmission (DTX) and/or Cell discontinuous reception (DRX) can be configured wherein:

periodic cell DTX/DRX pattern is configured by UE-specific RRC signalling message Cell DTX and Cell DRX modes can be configured and operated separately (e.g., one RRC configuration set for DL and the other set for UL).

In the RRC_CONNECTED state, a UE may also be configured with mode 1 sidelink operation in addition to Cell DTX configuration. During the Cell DTX duration, the UE cannot receive PDCCH addressed to SL-RNTI and hence mode 1 sidelink grant from gNB. This will lead to interruption for SL communication. So, enhancement for SL communication is needed in cell supporting network energy savings.

Method 1

FIG. 2 illustrates an example method performed by a UE according to an embodiment of the disclosure. FIG. 2 illustrates a first method for triggering/initiating delay-aware buffer status reporting according to an embodiment of the disclosure. Various modifications may be made to the method illustrated in the flowcharts of FIG. 2. For example, although shown as a series of operations, various operations in each figure may overlap, occur in parallel, occur in a different order, or occur multiple times. In other examples, operations may be omitted or replaced with other operations.

Referring FIG. 2, the UE is in RRC_CONNECTED state and the UE is configured with Cell DTX configuration for SpCell (201). The UE is configured with scheduled resource allocation (e.g., mode 1 resource allocation) (203). The UE is configured by gNB with exceptional resource pool for SL communication (205). When the UE enters the DTX duration (i.e., at the start of Cell DTX duration or during the Cell DTX duration): the UE switches to mode 2 (i.e., autonomous resource selection), the UE stops monitoring PDCCH addressed to SL-RNTI (or SL-CS-RNTI or SL-V2X-RNTI) and the UE uses the exceptional resource pool for SL communication (207). When the UE exits the DTX duration (i.e., at the end of Cell DTX duration), the UE switches back to mode 1, the UE starts using the scheduled resources for SL communication, the UE starts monitoring PDCCH addressed to SL-RNTI (or SL-CS-RNTI or SL-V2X-RNTI).

(201) A UE is in RRC_CONNECTED state. Periodic cell DTX pattern may be configured by a 'duration' and 'period' field wherein during the 'duration' interval which occurs periodically every 'period', cell does not perform transmission (or stops certain transmissions (e.g., PDCCH, PDSCH, PBCH, SSBs, etc.). During the interval 'period-duration' cell perform transmission (or certain transmissions (e.g., PDCCH, PDSCH, PBCH, SSBs, etc.)). Alternately, periodic cell DTX pattern may be configured by a 'duration' and 'period' field wherein during the 'duration' interval which occurs periodically every 'period', cell perform transmission and during the interval 'period-duration' cell does not perform transmission (or stops certain transmissions (e.g., PDCCH, PDSCH, PBCH, SSBs, etc.)). Periodic cell DRX pattern may be configured by a 'duration' and 'period' field wherein during the 'duration' interval which occurs periodically every 'period', cell does not perform reception (or stops certain receptions e.g., PUCCH, PUSCH, PRACH etc). During the interval 'period-duration' cell perform reception (or certain reception (e.g., PUCCH, PUSCH, PRACH etc.)). Alternately, periodic cell DRX pattern may be configured by a 'duration' and 'period' field wherein during the 'duration' interval which occurs periodically every 'period', cell perform reception and during the interval 'period-duration' cell does not perform reception (or stops certain receptions e.g., PUCCH, PUSCH, PRACH etc.). During the cell level DRX duration where network (i.e., base station) does not receive transmission (or certain transmissions) from UE on the uplink of that cell, UE does not transmit certain transmissions in uplink of that cell. In an embodiment, network DTX duration in above description may be the cell level inactive duration where cell does not transmit any transmission to UE or does not transmit any dedicated transmission to UE or does not transmit certain transmissions (e.g., PDCCH, PDSCH, PBCH, etc.) to UE. The above configuration may be configured for SpCell or one or more serving cells. Serving cell can be SpCell or SCell.

(203) The UE is also configured with scheduled resource allocation (e.g., mode 1 resource allocation) wherein UE scheduled pool of resources and SL-RNTI (or SL-CS-RNTI or SL-V2X-RNTI) is signalled by gNB to UE in RRCReconfiguration message. Specific SL resource to be used for transmitting SL MAC PDU from pool of SL resources is signalled by gNB to UE using PDCCH addressed to SL-RNTI (or SL-CS-RNTI or SL-V2X-RNTI).

In an embodiment of this method of disclosure, the UE may be configured by gNB with exceptional resource pool for SL communication (205). If Mode 1 resource allocation is configured and SL configured grant (CG) type 1 is not configured:

When UE enters the Cell DTX duration (i.e., at the start of Cell DTX duration or during the Cell DTX duration), Cell DTX duration is the time interval during which cell does not transmit or does not transmit certain transmissions (e.g. PDCCH, PDSCH, PBCH, etc.): UE switches to mode 2 (i.e. autonomous resource selection), UE stops monitoring PDCCH addressed to SL-RNTI (or SL-CS-RNTI or SL-V2X-RNTI), UE uses the exceptional resource pool for SL communication (207). When UE exits the DTX duration (i.e., at the end of Cell DTX duration), UE switches back to mode 1, UE starts using the scheduled resources for SL communication, UE starts monitoring PDCCH addressed to SL-RNTI (or SL-CS-RNTI or SL-V2X-RNTI) (209). Exceptional resource pool may be configured in SIB or dedicated RRC signalling (e.g., RRCReconfiguration message). This exceptional resource pool used during the Cell DTX duration may be same or different from the one the UE uses during the RLF. In an embodiment, during the Cell DTX duration, UE may also suspend using the CG type 2 resources (if configured).

In an embodiment, this procedure is applied when UE is configured with exceptional resource pool for SL communication (or when UE is configured with exceptional resource pool for SL communication during Cell DTX). In an embodiment, UE may randomly select resource from exceptional resource pool during Cell DTX duration. In an embodiment, UE may select resource from exceptional resource pool based on sensing results during Cell DTX duration.

In another embodiment of this method of disclosure, if Mode 1 resource allocation is configured and SL CG type 1 resources are configured:

When UE enters the DTX duration (i.e., at the start of Cell DTX duration or during the Cell DTX duration): UE stops monitoring PDCCH addressed to SL-RNTI (or SL-CS-RNTI or SL-V2X-RNTI) and uses SL CG Type 1 resources/grants for SL communication. When UE exits the DTX duration (i.e., at the end of Cell DTX duration), UE starts monitoring PDCCH addressed to SL-RNTI (or SL-CS-RNTI or SL-V2X-RNTI) and uses assigned SL resources by PDCCH addressed to SL-RNTI (or SL-CS-RNTI or SL-V2X-RNTI) in addition to SL CG Type 1 resources/grants for SL communication. In an embodiment, during the Cell DTX duration, UE may also suspend using the CG type 2 resources (if configured).

In an embodiment, this procedure is applied when UE is not configured with exceptional resource pool for SL communication (or when UE is not configured with exceptional resource pool for SL communication during Cell DTX)

In another embodiment of this method of disclosure, if Mode 1 resource allocation is configured and SL CG type 2 resources are configured:

When UE enters the DTX duration (i.e., at the start of Cell DTX duration or during the Cell DTX duration): UE stops monitoring PDCCH addressed to SL-RNTI (or SL-CS-RNTI or SL-V2X-RNTI) and uses SL CG Type 2 resources/grants for SL communication. When UE exits the DTX duration (i.e., at the end of Cell DTX duration), UE starts monitoring PDCCH addressed to SL-RNTI (or SL-CS-RNTI or SL-V2X-RNTI) and uses assigned SL resources by PDCCH addressed to SL-RNTI (or SL-CS-RNTI or SL-V2X-RNTI) in addition to SL CG Type 2 resources/grants for SL communication.

In an embodiment, this procedure is applied when UE is not configured with exceptional resource pool for SL communication (or when UE is not configured with exceptional resource pool for SL communication during Cell DTX)

In another embodiment of this method of disclosure, if Mode 1 resource allocation is configured (and SL CG type 1 is not configured):

When UE enters the DTX duration (i.e., at the start of Cell DTX duration or during the Cell DTX duration): UE stops monitoring PDCCH addressed to SL-RNTI (or SL-CS-RNTI or SL-V2X-RNTI). When UE exits the DTX duration (i.e., at the end of Cell DTX duration), UE starts monitoring PDCCH addressed to SL-RNTI (or SL-CS-RNTI or SL-V2X-RNTI). In an embodiment, during the Cell DTX duration, UE may also suspend using the CG type 2 resources (if configured)

In an embodiment, this procedure is applied when UE is not configured with exceptional resource pool for SL communication (or when UE is not configured with exceptional resource pool for SL communication during Cell DTX)

In an embodiment, when UE switches to mode 2 operation during Cell DTX duration, UE may suspend the ongoing/pending mode 1 related UE procedures e.g., SR/BSR/HARQ feedback report and resume after Cell DTX duration termination. Alternately, when UE switches to mode 2 operation, UE may cancel the ongoing/pending mode 1 related UE procedures e.g., SR/BSR/HARQ feedback report and resets/stop the related timers.

Method 2

FIG. 3 illustrates an example method performed by a UE according to an embodiment of the disclosure. FIG. 3 illustrates a first method for triggering/initiating delay-aware buffer status reporting according to an embodiment of the disclosure. Various modifications may be made to the method illustrated in the flowcharts of FIG. 2. For example, although shown as a series of operations, various operations in each figure may overlap, occur in parallel, occur in a different order, or occur multiple times. In other examples, operations may be omitted or replaced with other operations.

Referring FIG. 3, the UE is in RRC_CONNECTED state and the UE is configured with Cell DTX configuration for SpCell (301). The UE is configured with scheduled resource allocation (e.g., mode 1 resource allocation) (303). The UE is configured by gNB with mode 2 (UE selected) resource pool(s) for SL communication (305). When UE enters the Cell DTX duration (i.e., at the start of Cell DTX duration or during the Cell DTX duration): UE switches to mode 2 (i.e. autonomous resource selection), UE stops monitoring PDCCH addressed to SL-RNTI (or SL-CS-RNTI or SL-V2X-RNTI), UE uses the mode 2 (UE selected) resource pool(s) for SL communication (307). When UE exits the DTX duration (i.e., at the end of Cell DTX duration), UE switches back to mode 1, UE starts using the scheduled resources for SL communication, UE starts monitoring PDCCH addressed to SL-RNTI (or SL-CS-RNTI or SL-V2X-RNTI) (309).

(301) A UE is in RRC_CONNECTED state. Periodic cell DTX pattern may be configured by a 'duration' and 'period' field wherein during the 'duration' interval which occurs periodically every 'period', cell does not perform transmission (or stops certain transmissions (e.g., PDCCH, PDSCH, PBCH, SSBs, etc.). During the interval 'period-duration' cell perform transmission (or certain transmissions (e.g., PDCCH, PDSCH, PBCH, SSBs, etc.)). Alternately, periodic cell DTX pattern may be configured by a 'duration' and 'period' field wherein during the 'duration' interval which occurs periodically every 'period', cell perform transmission and during the interval 'period-duration' cell does not perform transmission (or stops certain transmissions (e.g., PDSCH, PBCH, SSBs, etc.)). Periodic cell DRX pattern may be configured by a 'duration' and 'period' field wherein during the 'duration' interval which occurs periodically every 'period', cell does not perform reception (or stops certain receptions e.g., PUCCH, PUSCH, PRACH etc.). During the interval 'period-duration' cell perform reception (or certain reception (e.g., PDCCH, PUCCH, PUSCH, PRACH etc.)). Alternately, periodic cell DRX pattern may be configured by a 'duration' and 'period' field wherein during the 'duration' interval which occurs periodically every 'period', cell perform reception and during the interval 'period-duration' cell does not perform reception (or stops certain receptions e.g., PUCCH, PUSCH, PRACH etc.). During the cell level DRX duration where network (i.e., base station) does not receive transmission (or certain transmissions) from UE on the uplink of that cell, UE does not transmit (or does not transmit) certain transmissions in uplink of that cell. In an embodiment, network DTX duration in above description may be the cell level inactive duration where cell does not transmit any transmission to UE or does not transmit any dedicated transmission to UE or does not transmit certain transmissions (e.g., PDSCH, PBCH, etc.) to UE. The above configuration may be configured for SpCell or one or more serving cells. Serving cell can be SpCell or SCell.

(303) The UE is also configured with scheduled resource allocation (e.g., mode 1 resource allocation) wherein UE scheduled pool of resources and SL-RNTI (or SL-CS-RNTI or SL-V2X-RNTI) is signalled by gNB to UE in RRCReconfiguration message. Specific SL resource to be used for transmitting SL MAC PDU from pool of SL resources is signalled by gNB to UE using PDCCH addressed to SL-RNTI (or SL-CS-RNTI or SL-V2X-RNTI).

In an embodiment of this method of disclosure, UE may be configured by gNB with mode 2 (UE selected) resource pool(s) for SL communication. If Mode 1 resource allocation is configured (and SL CG type 1 is not configured):

When UE enters the Cell DTX duration (i.e., at the start of Cell DTX duration or during the Cell DTX duration): UE switches to mode 2 (i.e. autonomous resource selection), UE stops monitoring PDCCH addressed to SL-RNTI (or SL-CS-RNTI or SL-V2X-RNTI), UE uses the mode 2 (UE selected) resource pool(s) for SL communication. When UE exits the DTX duration (i.e., at the end of Cell DTX duration), UE switches back to mode 1, UE starts using the scheduled resources for SL communication, UE starts monitoring PDCCH addressed to SL-RNTI (or SL-CS-RNTI or SL-V2X-RNTI). Mode 2 (UE selected) resource pool(s) may be configured in SIB or dedicated RRC signalling (e.g., RRCReconfiguration message) or by pre-configuration. In an embodiment, during the Cell DTX duration, UE may also suspend using the CG type 2 resources (if configured)

In an embodiment, this procedure is applied when UE is configured with mode 2 (UE selected) resource pool(s) for SL communication (or when UE is configured with mode 2 (UE selected) resource pool(s) for SL communication during Cell DTX)

In another embodiment of this method of disclosure, if Mode 1 resource allocation is configured and SL CG type 1 resources are configured:

When UE enters the DTX duration (i.e., at the start of Cell DTX duration or during the Cell DTX duration): UE stops monitoring PDCCH addressed to SL-RNTI (or SL-CS-RNTI or SL-V2X-RNTI) and uses SL CG Type 1 resources/grants for SL communication. When UE exits the DTX duration (i.e., at the end of Cell DTX duration), UE starts monitoring PDCCH addressed to SL-RNTI (or SL-CS-RNTI or SL-V2X-RNTI) and uses assigned SL resources by PDCCH addressed to SL-RNTI (or SL-CS-RNTI or SL-V2X-RNTI) in addition to SL CG Type 1 resources/grants for SL communication. In an embodiment, during the Cell DTX duration, UE may also suspend using the CG type 2 resources (if configured).

In an embodiment, this procedure is applied when UE is not configured with mode 2 (UE selected) resource pool(s) for SL communication (or when UE is not configured with mode 2 (UE selected) resource pool(s) for SL communication during Cell DTX)

In another embodiment of this method of disclosure, if Mode 1 resource allocation is configured and SL CG type 2 resources are configured:

When UE enters the DTX duration (i.e., at the start of Cell DTX duration or during the Cell DTX duration): UE stops monitoring PDCCH addressed to SL-RNTI (or SL-CS-RNTI or SL-V2X-RNTI) and uses SL CG Type 2 resources/grants for SL communication. When UE exits the DTX duration (i.e., at the end of Cell DTX duration), UE starts monitoring PDCCH addressed to SL-RNTI (or SL-CS-RNTI or SL-V2X-RNTI) and uses assigned SL resources by PDCCH addressed to SL-RNTI (or SL-CS-RNTI or SL-V2X-RNTI) in addition to SL CG Type 2 resources/grants for SL communication.

In an embodiment, this procedure is applied when UE is not configured with mode 2 (UE selected) resource pool(s) for SL communication (or when UE is not configured with mode 2 (UE selected) resource pool(s) for SL communication during Cell DTX)

In another embodiment of this method of disclosure, if Mode 1 resource allocation is configured (and SL CG type 1 is not configured):

When UE enters the DTX duration (i.e., at the start of Cell DTX duration or during the Cell DTX duration): UE stops monitoring PDCCH addressed to SL-RNTI (or SL-CS-RNTI or SL-V2X-RNTI). When UE exits the DTX duration (i.e., at the end of Cell DTX duration), UE starts monitoring PDCCH addressed to SL-RNTI (or SL-CS-RNTI or SL-V2X-RNTI). In an embodiment, during the Cell DTX duration, UE may also suspend using the CG type 2 resources (if configured)

In an embodiment, this procedure is applied when UE is not configured with mode 2 (UE selected) resource pool(s) for SL communication (or when UE is not configured with mode 2 (UE selected) resource pool(s) for SL communication during Cell DTX)

In an embodiment, when UE switches to mode 2 operation during Cell DTX duration, UE may suspend the ongoing/pending mode 1 related UE procedures e.g., SR/BSR/HARQ feedback report and resume after Cell DTX duration termination. Alternately, when UE switches to mode 2 operation, UE may cancel the ongoing/pending mode 1 related UE procedures e.g., SR/BSR/HARQ feedback report and resets/stop the related timers.

Method 3

A UE is in RRC_CONNECTED state. Periodic cell DTX pattern may be configured by a 'duration' and 'period' field wherein during the 'duration' interval which occurs periodically every 'period', cell does not perform transmission (or stops certain transmissions (e.g., PDCCH, PDSCH, PBCH, SSBs, etc.). During the interval 'period-duration' cell perform transmission (or certain transmissions (e.g., PDCCH, PDSCH, PBCH, SSBs, etc.)). Alternately, periodic cell DTX pattern may be configured by a 'duration' and 'period' field wherein during the 'duration' interval which occurs periodically every 'period', cell perform transmission and during the interval 'period-duration' cell does not perform transmission (or stops certain transmissions (e.g., PDSCH, PBCH, SSBs, etc.)). Periodic cell DRX pattern may be configured by a 'duration' and 'period' field wherein during the 'duration' interval which occurs periodically every 'period', cell does not perform reception (or stops certain receptions e.g., PUCCH, PUSCH, PRACH etc). During the interval 'period-duration' cell perform reception (or certain reception (e.g., PUCCH, PUSCH, PRACH etc.)). Alternately, periodic cell DRX pattern may be configured by a 'duration' and 'period' field wherein during the 'duration' interval which occurs periodically every 'period', cell perform reception and during the interval 'period-duration' cell does not perform reception (or stops certain receptions e.g., PUCCH, PUSCH, PRACH etc.). During the cell level DRX duration where network (i.e., base station) does not receive transmission (or certain transmissions) from UE on the uplink of that cell, UE does not transmit certain transmissions in uplink of that cell. In an embodiment, network DTX duration in above description may be the cell level inactive duration where cell does not transmit any transmission to UE or does not transmit any dedicated transmission to UE or does not transmit certain transmissions (e.g., PDSCH, PBCH, etc.) to UE. The above configuration may be configured for SpCell or one or more serving cells. Serving cell can be SpCell or SCell.

In an embodiment, if UE is in RRC_CONNECTED and network energy saving (NES) (Cell DTX is configured wherein network does not transmit PDCCH for SL communication to UE) is configured, Network (i.e., gNB) does not configure or reconfigures the UE such that scheduled resource allocation (SL DG and CG type 2) is configured to UE.

Figure 4:
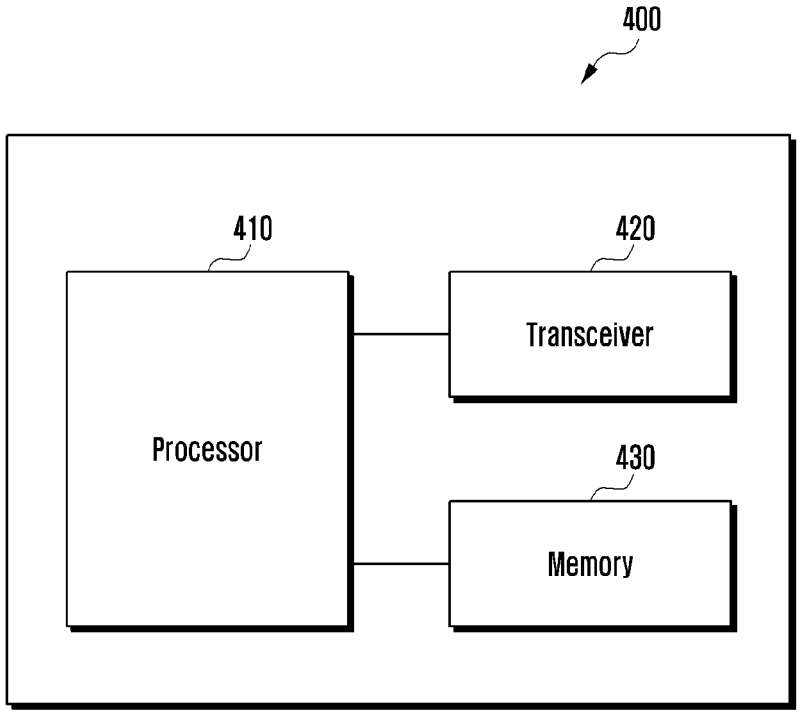
FIG. 4 illustrates an example electronic device according to embodiments of the disclosure.

FIG. 4 illustrates an electronic device according to embodiments of the disclosure.

Referring to the FIG. 4, the electronic device 400 may include a processor 410, a transceiver 420 and a memory 430. However, all of the illustrated components are not essential. The electronic device 400 may be implemented by more or less components than those illustrated in FIG. 4. In addition, the processor 410 and the transceiver 420 and the memory 430 may be implemented as a single chip according to another embodiment.

The electronic device 400 may correspond to the UE described above.

The aforementioned components will now be described in detail.

The processor 410 may include one or more processors or other processing devices that control the proposed function, process, and/or method. Operation of the electronic device 400 may be implemented by the processor 410.

The transceiver 420 may include a RF transmitter for up-converting and amplifying a transmitted signal, and a RF receiver for down-converting a frequency of a received signal. However, according to another embodiment, the transceiver 420 may be implemented by more or less components than those illustrated in components.

The transceiver 420 may be connected to the processor 410 and transmit and/or receive a signal. The signal may include control information and data. In addition, the transceiver 420 may receive the signal through a wireless channel and output the signal to the processor 410. The transceiver 420 may transmit a signal output from the processor 410 through the wireless channel.

The memory 430 may store the control information or the data included in a signal obtained by the electronic device 400. The memory 430 may be connected to the processor 410 and store at least one instruction or a protocol or a parameter for the proposed function, process, and/or method. The memory 430 may include read-only memory (ROM) and/or random-access memory (RAM) and/or hard disk and/or CD-ROM and/or DVD and/or other storage devices.

Figure 5:
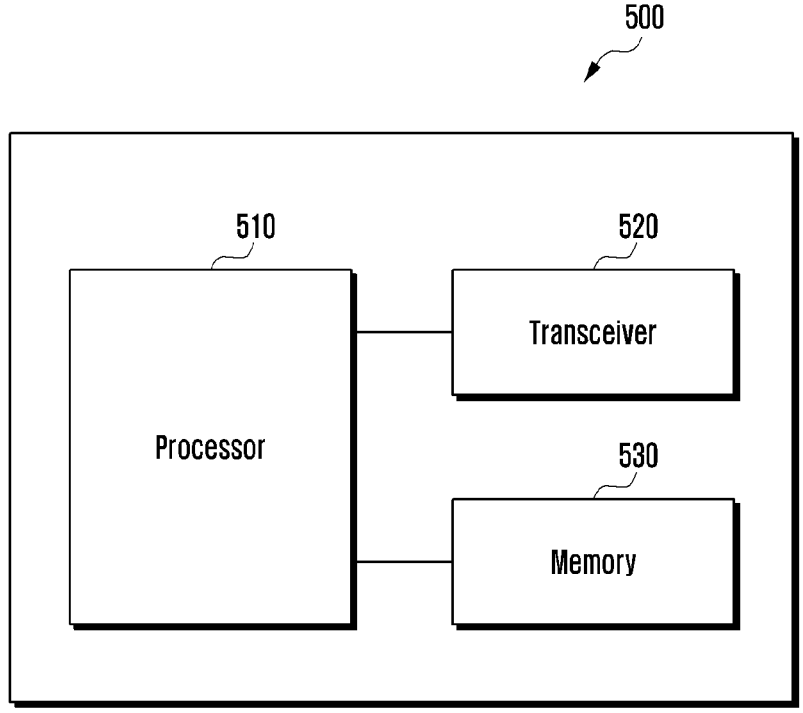
FIG. 5 illustrates an example base station according to embodiments of the disclosure.

FIG. 5 illustrates a base station according to embodiments of the disclosure.

Referring to the FIG. 5, the base station 500 may include a processor 510, a transceiver 520 and a memory 530. However, all of the illustrated components are not essential. The base station 500 may be implemented by more or less components than those illustrated in FIG. 5. In addition, the processor 510 and the transceiver 520 and the memory 530 may be implemented as a single chip according to another embodiment.

The base station 500 may correspond to the gNB described above.

The aforementioned components will now be described in detail.

The processor 510 may include one or more processors or other processing devices that control the proposed function, process, and/or method. Operation of the base station 500 may be implemented by the processor 510.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the base station 500. The memory 530 may be connected to the processor 510 and store at least one instruction or a protocol or a parameter for the proposed function, process, and/or method. The memory 530 may include read-only memory (ROM) and/or random-access memory (RAM) and/or hard disk and/or CD-ROM and/or DVD and/or other storage devices.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored n non-volatile memories including a random-access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Any of the above variation embodiments can be utilized independently or in combination with at least one other variation embodiment. The above flowchart(s) illustrate example methods that can be implemented in accordance with the principles of the disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the disclosure has been described with exemplary embodiments, various changes and modifications may be suggested to one skilled in the art. It is intended that the disclosure encompass such changes and modifications as fall within the scope of the appended claims. None of the descriptions in this application should be read as implying that any particular element, step, or function is an essential element that must be included in the claims scope. The scope of patented subject matter is defined by the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:

receiving a discontinuous transmission (DTX) configuration associated with a DTX duration;

identifying that the UE is configured with a sidelink resource allocation mode 1;

in case that the UE is configured with a resource pool for sidelink communication during the DTX duration:

switching to a sidelink resource allocation mode 2 based on entering the DTX duration; and performing the sidelink communication during the DTX duration based on a resource selected by the UE from the resource pool for the sidelink communication, wherein monitoring of a physical downlink control channel (PDCCH) is stopped during the DTX duration, and wherein the PDCCH is addressed to a radio network temporary identifier (RNTI) associated with the sidelink resource allocation mode 1.

2. The method of claim 1, wherein use of a sidelink configured grant (CG) resource for a sidelink CG type 2 configured for the UE is suspended during the DTX duration in case that the UE is configured with the resource pool for the sidelink communication during the DTX duration.

3. The method of claim 1, further comprising, in case that the UE is configured with the resource pool for the sidelink communication during the DTX duration and the DTX duration is terminated:

switching to the sidelink resource allocation mode 1;

monitoring the PDCCH addressed to the RNTI associated with the sidelink resource allocation mode 1; and performing the sidelink communication based on a scheduled resource identified by the PDCCH.

4. The method of claim 1, wherein the resource pool for the sidelink communication during the DTX duration is same as or different from a resource pool for radio link failure (RLF).

5. The method of claim 1, wherein the resource pool for the sidelink communication during the DTX duration is for the sidelink resource allocation mode 2.

6. The method of claim 1, wherein the resource pool for the sidelink communication during the DTX duration is configured via a system information block (SIB) or a dedicated radio resource control (RRC) message.

7. The method of claim 1, wherein, in case that the UE switches to the sidelink resource allocation mode 2 based on entering the DTX duration, at least one sidelink resource allocation mode 1 related procedure that is pended is suspended or cancelled before the DTX duration is terminated, and the at least one sidelink resource allocation mode 1 related procedure includes a procedure for a scheduling request (SR), a procedure for a buffer status report (BSR), and a procedure for hybrid automatic repeat request (HARQ) feedback.

8. The method of claim 1, further comprising, in case that the UE is not configured with the resource pool for the sidelink communication during the DTX duration and the UE is configured with a sidelink configured grant (CG) resource for a sidelink CG type 1 or 2:

switching to the sidelink resource allocation mode 2 based on entering the DTX duration; and performing the sidelink communication during the DTX duration based on the sidelink CG resource.

9. The method of claim 8, further comprising, in case that the UE is not configured with the resource pool for the sidelink communication during the DTX duration, the UE is configured with the sidelink CG resource and the DTX duration is terminated:

switching to the sidelink resource allocation mode 1;

monitoring the PDCCH addressed to the RNTI associated with the sidelink resource allocation mode 1; and performing the sidelink communication based on a scheduled resource identified by the PDCCH and the sidelink CG resource.

10. The method of claim 1, wherein:

the UE is configured with a resource pool for the sidelink resource allocation mode 1, and the DTX configuration is configured for a special cell (SpCell) of the UE.

11. A user equipment (UE) in a communication system, the UE comprising:

a transceiver; and a processor coupled with the transceiver and configured to:

receive a discontinuous transmission (DTX) configuration associated with a DTX duration;

identify that the UE is configured with a sidelink resource allocation mode 1;

in case that the UE is configured with a resource pool for sidelink communication during the DTX duration:

switch to a sidelink resource allocation mode 2 based on entering the DTX duration; and perform the sidelink communication during the DTX duration based on a resource selected by the UE from the resource pool for the sidelink communication, wherein monitoring of a physical downlink control channel (PDCCH) is stopped during the DTX duration, and wherein the PDCCH is addressed to a radio network temporary identifier (RNTI) associated with the sidelink resource allocation mode 1.

12. The UE of claim 11, wherein use of a sidelink configured grant (CG) resource for a sidelink CG type 2 configured for the UE is suspended during the DTX duration in case that the UE is configured with the resource pool for the sidelink communication during the DTX duration.

13. The UE of claim 11, wherein the processor is further configured to, in case that the UE is configured with the resource pool for the sidelink communication during the DTX duration and the DTX duration is terminated:

switch to the sidelink resource allocation mode 1;

monitor, via the transceiver, the PDCCH addressed to the RNTI associated with the sidelink resource allocation mode 1; and perform, via the transceiver, the sidelink communication based on a scheduled resource identified by the PDCCH.

14. The UE of claim 11, wherein the resource pool for the sidelink communication during the DTX duration is same as or different from a resource pool for radio link failure (RLF).

15. The UE of claim 11, wherein the resource pool for the sidelink communication during the DTX duration is for the sidelink resource allocation mode 2.

16. The UE of claim 11, wherein the resource pool for the sidelink communication during the DTX duration is configured via a system information block (SIB) or a dedicated radio resource control (RRC) message.

17. The UE of claim 11, wherein, in case that the UE switches to the sidelink resource allocation mode 2 based on entering the DTX duration, at least one sidelink resource allocation mode 1 related procedure which is pended is suspended or cancelled before the DTX duration is terminated, and the at least one sidelink resource allocation mode 1 related procedure includes a procedure for a scheduling request (SR), a procedure for a buffer status report (BSR), and a procedure for hybrid automatic repeat request (HARQ) feedback.

18. The UE of claim 11, wherein the processor is further configured to, in case that the UE is not configured with the resource pool for the sidelink communication during the DTX duration and the UE is configured with a sidelink configured grant (CG) resource for a sidelink CG type 1 or 2:

switch to the sidelink resource allocation mode 2 based on entering the DTX duration; and perform, via the transceiver, the sidelink communication during the DTX duration based on the sidelink CG resource.

19. The UE of claim 18, wherein the processor is further configured to, in case that the UE is not configured with the resource pool for the sidelink communication during the DTX duration, the UE is configured with a sidelink configured grant (CG) resource and the DTX duration is terminated:

switch to the sidelink resource allocation mode 1;

monitor, via the transceiver, the PDCCH addressed to the RNTI associated with the sidelink resource allocation mode 1; and perform, via the transceiver, the sidelink communication based on a scheduled resource identified by the PDCCH and the sidelink CG resource.

20. The UE of claim 11, wherein:

the UE is configured with a resource pool for the sidelink resource allocation mode 1, and the DTX configuration is configured for a special cell (SpCell) of the UE.

* * * * *